Figure 1:
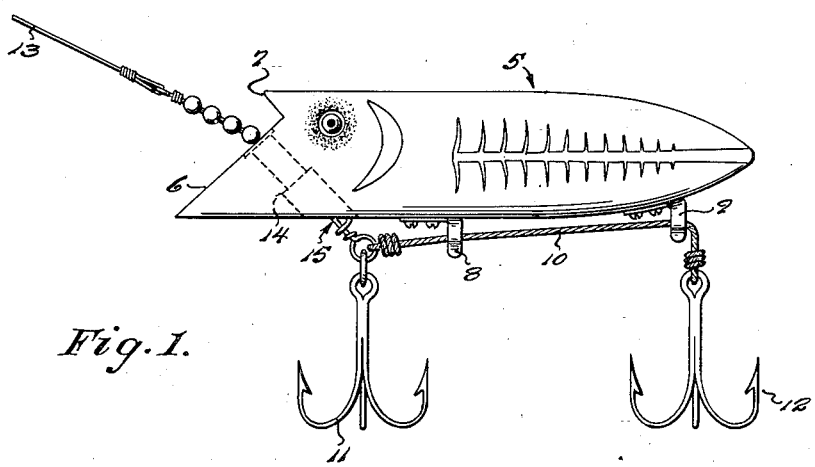

March 25, 1941. W. D. MINSER 2,236,353
FISH LURE
Filed July 12, 1939

INVENTOR.
William D. Minser
BY
ATTORNEYS.

Patented Mar. 25, 1941

2,236,353

UNITED STATES PATENT OFFICE 2,236,353

FISH LURE

William D. Minser, Seattle, Wash.

Application July 12, 1939, Serial No. 283,923

7 Claims. (Cl. 43—46)

This invention relates to fishing lures of the type commonly known as plugs, and is especially directed to improvements in the rigging therefor, the principal object being to provide a lure of this nature so designed in relation to its hooks and the fishing line as to entirely relieve the plug of any tension during the operation of playing a hooked fish and to permit the plug to be disconnected with a minimum of effort from both the line and the hooks.

It may be here stated that a surface similarity to the stated objectives is found in U. S. Pat. No. 2,102,492 issued to W. A. Stolley under date of December 14, 1937, the very major objection to the arrangement therein disclosed as well as that of the somewhat similar lure illustrated and described in later U. S. Pat. No. 2,110,382, issued March 8, 1938, to J. H. Martin being that the employed drag link distinguishing both plugs is fixedly associated with the body of the plug and thereby necessarily transmits a strain to the plug corresponding to the tension which is applied from the hooks to the drag link. The frequent splitting of these plugs which occurs following a strike can be attributed directly to torsional stresses carried from the hooks to the body of the plug.

My present advancements consist in the novel construction and in the adaptation and combination of parts hereinafter described and claimed.

In the drawing:

Figure 1 is a side elevational view illustrating a plug rigged in accordance with the present invention.

Figure 2:
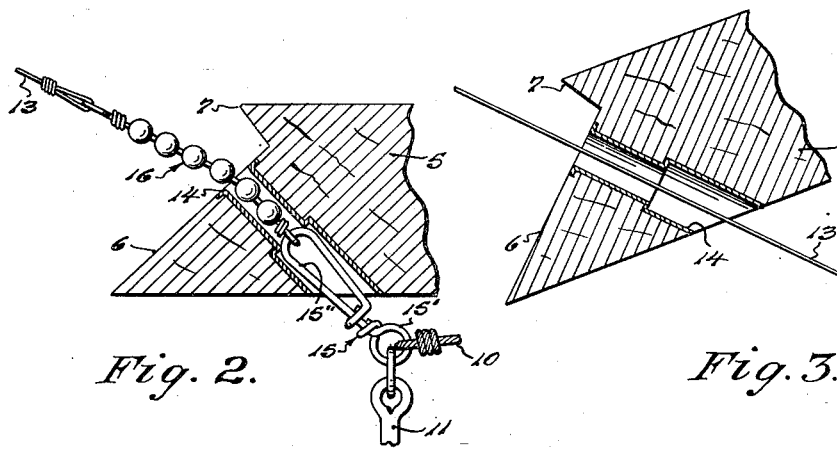
Figure 3:
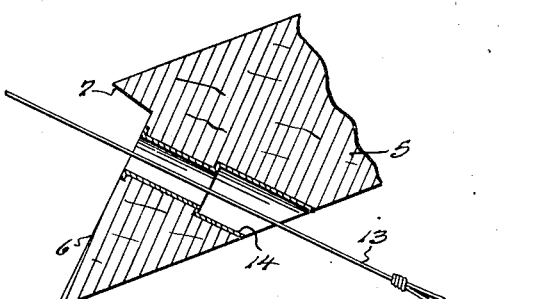
Figure 4:
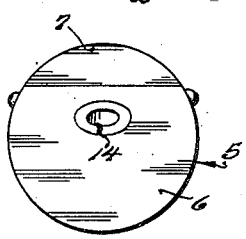

Figs. 2 and 3 are enlarged fragmentary longitudinal vertical sections through the head end of the plug, the former view illustrating the plug in the position which the same normally assumes in relation to the hooks and the latter view showing the manner in which the plug is caused to run up the line following the hooking of a fish; and Fig. 4 is a front elevational view of the plug with the line and hooks detached.

The lure itself comprises a body 5 which desirably is of wood construction but which may be of any form inasmuch as the hereinafter described rigging features are applicable to plugs of substantially any shape. The design shown is one which tapers rearwardly and at its front end is cut diagonally to form a sloping face 6 terminating at the upper edge in an overhang 7, a form which has met with considerable favor from the fishing public. Similar to the above-identified patents and for the same purpose that like or equivalent means are applied to the same, my plug is equipped on the underside with a pair of longitudinally spaced spring clips 8—9 characterized in that the side prongs of each clip yield laterally under application of pressure to form a releasing connection as between the plug and the supporting cord or snood 10 for a pair of gang-hooks 11—12. 13 represents the fishing line to which, according to my present advancements, the snood is directly coupled in a manner permitting a run-up of the plug body on the line.

In arriving at this end I provide a line reeveway within the plug, producing this reeve-way as a diagonal bore which extends on the vertical center line of the body from the sloping face 6 and emerges somewhat forwardly of the front clip 8, the bore being lined with a sleeve 14 which is diametrically reduced at its upper end to form a median shoulder. Acting to engage this shoulder in the normal plug-connected position of the hooks, the forward end of the snood is fitted with a conventional type coupling 15 produced from a single piece of spring wire of which one end forms a permanent eye 15' and the other end a mousing-type snap hook 15" of a diameter less than that of the enlarged portion but exceeding the diameter of the reduced portion of the sleeve. To this snap hook is detachably connected the terminal ring of a free link 16 which at its opposite end finds connection with the fishing line 13. The free link acts as a swivel and desirably is comprised of a chain of connected balls.

It is believed to be apparent from the foregoing description taken in connection with the drawing that my advancements in the rigging of a fishing plug frees the plug entirely from the effects of torsional stresses following release of the gang-hooks from the spring clips. It is believed equally obvious that the run-up of the plug on the line obviates the development by the plug of any resistance to the thrashing movements of the hooked fish. Also apparent is the ease with which the hooks and their supporting snood can be detached from the plug by the simple expedient of unclasping the mousing bill from the shank of the snap hook 15", permitting the terminal ring of the link 16 to be carried over the bill.

What I claim is:

1. In a fish lure, the combination of a plug body bored diagonally from the upper to the under side of the same, a lining sleeve fitting the bore of the body, said sleeve being diametrically reduced at its upper end to form a median shoulder, a swivel link received for free sliding movement through said sleeve, a line tie at the upper end of the link, an eye at the lower end of the link, and a detachable coupling associated with said eye and functioning to connect the link to a hook, said coupling being transversely of a dimension less than the lower enlarged portion but exceeding the upper reduced portion of the sleeve so as to obtain a bearing engagement between the coupling and the median shoulder of the sleeve.

2. The combination of gang-hooks, a snood therefor, a fish line, a coupling providing detachable connection as between the snood and the fish line, and a fish lure formed with a reeve-way for the free sliding movement of the fish line, and means secured to the lure and acting to normally hold the snood thereto while permitting release of the snood by the force of a strike, said coupling being of a size to prevent passage through the reeve-way and acting in the assembled position of the parts to abut the lower end of the reeve-way for applying the drag force to the fish lure through said coupling.

3. The combination of gang-hooks, a snood therefor, a drag link composed of a connected series of independently swiveled balls, a line tie at the leading end of the link, a snap hook detachably associated with the opposite end of the link and connected with the snood, and a fish lure formed with a reeve-way for the free sliding movement of the multiple-ball link.

4. The combination of fishing hooks, a snood therefor, a drag link composed of a connected series of independently swiveled balls, a line tie at the leading end of said link and an eye at the opposite end of the link, an eye at its opposite end, and a coupling connected with the snood and detachably engaging said eye, and a fish lure formed with a reeve-way for the free sliding movement of the multiple-ball link, said coupling being of a size to prevent passage through the reeve-way and acting in the assembled position of the parts to abut the lower end of the reeve-way for applying the drag force to the fish lure through said coupling.

5. In a fish lure, the combination of a plug body having a bore therethrough, a lining sleeve fitting said bore, a swivel link received for free sliding movement through said sleeve, a line tie at the upper end of the link, an eye at the lower end of the link and a coupling of a transverse dimension exceeding the diameter of the sleeve detachably associated with said eye of the link and functioning to connect the link to a hook.

6. In a fish lure, the combination of a plug body having a reeve-way extending therethrough, a link received through the reeve-way, a line connection at the upper end of said link and means at the lower end of said link acting in the assembled position of the parts to abut the lower end of the reeve-way for applying the drag force directly through said means to the plug body, said means being characterized in that the same permits a free run-up of the plug on the line.

7. In a fish lure, the combination of a plug body having a bore extending rearwardly in a diagonal direction from the upper front end of the body, and a drag link having clearance relative to the wall of the bore and received therein to functionally engage the plug interiorly of the latter.

WILLIAM D. MINSER.

CERTIFICATE OF CORRECTION.

Patent No. 2,236,353. March 25, 1941.

WILLIAM D. MINSER.

It is hereby certified that error appears in the printed specification of the above numbered patent requiring correction as follows: Page 2, first column, line 37, and second column, line 1, claim 4, strike out the words "an eye at its opposite end, and"; line 15, claim 5, after "link" insert a comma; and that the said Letters Patent should be read with this correction therein that the same may conform to the record of the case in the Patent Office.

Signed and sealed this 6th day of May, A. D. 1941.

(Seal)

Henry Van Arsdale,
Acting Commissioner of Patents.